US011779156B2

(12) United States Patent
Epstein

(10) Patent No.: US 11,779,156 B2
(45) Date of Patent: Oct. 10, 2023

(54) REUSABLE BEVERAGE CONTAINER ASSEMBLY

(71) Applicant: SPROGO LLC, Wallingford, PA (US)

(72) Inventor: Joshua Epstein, Wallingford, PA (US)

(73) Assignee: SPROGO LLC, Wallingford, PA (US)

( * ) Notice: Subject to any disclaimer, the term of this patent is extended or adjusted under 35 U.S.C. 154(b) by 43 days.

(21) Appl. No.: 17/174,400

(22) Filed: Feb. 12, 2021

(65) Prior Publication Data
US 2022/0257036 A1    Aug. 18, 2022

(51) Int. Cl.
  *B65D 81/38* (2006.01)
  *A47G 19/22* (2006.01)
  *A47J 41/00* (2006.01)
  *B65D 81/18* (2006.01)

(52) U.S. Cl.
CPC ..... *B65D 81/3869* (2013.01); *A47G 19/2272* (2013.01); *A47G 19/2288* (2013.01); *A47J 41/0072* (2013.01); *B65D 81/18* (2013.01); *B65D 81/38* (2013.01); *B65D 81/3806* (2013.01); *B65D 81/3841* (2013.01)

(58) Field of Classification Search
CPC ............ A47G 19/2272; A47G 19/127; A47G 19/2288; A47J 41/0077; A47J 41/0072; B65D 81/18; B65D 81/38; B65D 81/3809; B65D 81/3841; B65D 81/3869
See application file for complete search history.

(56) References Cited

U.S. PATENT DOCUMENTS

| 2,812,116 A * | 11/1957 | Newman ............ A47J 41/0077 222/472 |
| 4,718,566 A | 1/1988 | Wunder |
| 5,090,213 A | 2/1992 | Glassman |
| 6,076,699 A * | 6/2000 | Seager ................ B65D 43/021 215/396 |
| 6,367,652 B1 * | 4/2002 | Toida ................. B65D 25/2811 220/592.16 |
| 6,612,456 B1 | 9/2003 | Hundley et al. |
| D510,678 S | 10/2005 | Krasne et al. |
| D517,869 S | 3/2006 | Graves et al. |
| D547,605 S | 7/2007 | Edelstein et al. |
| D554,941 S | 11/2007 | Mansfield |
| D560,100 S | 1/2008 | Wang |

(Continued)

FOREIGN PATENT DOCUMENTS

| CA | 169337 | 2/2017 |
| TW | M431648 U | 6/2012 |
| TW | 186736 | 11/2017 |

OTHER PUBLICATIONS

International Search Report and Written Opinion dated May 16, 2022 in PCT International Application No. PCT/US2022/016086.
(Continued)

*Primary Examiner* — John K Fristoe, Jr.
*Assistant Examiner* — Jennifer Castriotta
(74) *Attorney, Agent, or Firm* — Amster, Rothstein & Ebenstein LLP

(57) ABSTRACT

A beverage container assembly including a cup and a lid. The cup includes an outer wall and an inner wall. The cup may have a double truncated cone shape. The lid includes a spout for drinking a beverage held in the cup and a number of holes that allow aroma to escape from the cup. The cup includes an internal protrusion that aids in mixing the beverage.

19 Claims, 6 Drawing Sheets

(56) References Cited

U.S. PATENT DOCUMENTS

| | | | |
|---|---|---|---|
| D560,101 S | 1/2008 | Wang | |
| D563,733 S | 3/2008 | Wang | |
| 7,380,685 B2 * | 6/2008 | Simmons | B65D 81/3869 |
| | | | 206/508 |
| D582,580 S | 12/2008 | Spangler et al. | |
| D583,194 S | 12/2008 | Pourounidis et al. | |
| D608,156 S | 1/2010 | Bodum | |
| D614,448 S | 4/2010 | Cahen | |
| D621,665 S | 8/2010 | Lion et al. | |
| D624,361 S | 9/2010 | Roth et al. | |
| D637,079 S | 5/2011 | Brown et al. | |
| 8,132,687 B2 * | 3/2012 | Fedusa | B65D 81/3869 |
| | | | 220/592.16 |
| D660,078 S | 5/2012 | Kehoe | |
| D669,310 S | 10/2012 | Barreto et al. | |
| D698,200 S | 1/2014 | Lauwagie | |
| D742,563 S | 11/2015 | Kasha | |
| D743,209 S * | 11/2015 | Maas | D7/532 |
| D756,773 S | 5/2016 | Brannock | |
| 9,451,842 B2 | 9/2016 | Melton et al. | |
| 9,504,349 B2 * | 11/2016 | Rosskelly | A47J 31/56 |
| D779,884 S | 2/2017 | Karussi | |
| D815,531 S | 4/2018 | Wahl et al. | |
| D817,064 S | 5/2018 | Samartgis | |
| D840,755 S | 2/2019 | Kehoe | |
| D903,423 S | 12/2020 | Huckestein et al. | |
| D948,964 S | 4/2022 | Lindsay et al. | |
| 2003/0209547 A1 | 11/2003 | Lin | |
| 2007/0154665 A1 * | 7/2007 | Cheng | B65D 81/3869 |
| | | | 428/34.4 |
| 2008/0061069 A1 | 3/2008 | Edelstein et al. | |
| 2012/0080429 A1 * | 4/2012 | Steininger | B65D 47/286 |
| | | | 220/200 |
| 2016/0213177 A1 | 7/2016 | Maple et al. | |
| 2016/0270572 A1 | 9/2016 | Karussi et al. | |
| 2019/0367250 A1 * | 12/2019 | Slusarski | B65D 15/14 |
| 2020/0407123 A1 | 12/2020 | Adams, Jr. et al. | |
| 2022/0211196 A1 | 7/2022 | Lim | |
| 2022/0257036 A1 | 8/2022 | Epstein | |

OTHER PUBLICATIONS

[Tupkee Double Wall Glass Tumbler], available in Amazon.com, date Oct. 27, 2021 [online], [site visited Apr. 6, 2023], available from the internet URL: https://www.amazon.com/Tupkee-Double-Wall-Glass-Tumbler/dp/B09J3Z68S5/ (Year 2021).

[Tervis Made in USA Double Walled Clear & Colorful Lidded Insulated Tumbler], available in Amazon.com, date first available May 3, 2021 [online], [site visited Apr. 6, 2023], available from the internet URL: https://www.amazon.com/dp/B08XYCY836 (Year: 2021).

[SPROGO, To-Go Espresso Cup], available in Amazon.com, date first available Aug. 28, 2022 [online], [site visited Apr. 6, 2023], available from the internet URL: https://www.amazon.com/SPROGO-Espresso-Tumbler-Reusable-Cupholders/dp/B0BC26W4WK (Year: 2022).

* cited by examiner

REUSABLE BEVERAGE CONTAINER ASSEMBLY

FIELD OF THE INVENTION

The present invention is directed to beverage container assemblies, and more particularly to reusable beverage container assemblies that include a cup and a lid and that are intended for beverages such as espresso.

BACKGROUND

A wide variety of beverage container assemblies have been available for many years. Such products typically feature a large volume size and a simple conical shape, examples being travel mugs and shaker bottles. Such drinking assemblies may be made of, for example, glass, plastic and stainless steel.

The size of most conventional "on-the-go" beverage container assemblies is suitable for holding a relatively large amount of liquid, and thus intended for beverages such as, for example, coffee, soda, juice and protein shakes. However, these drinking assemblies are generally oversized for those types of beverages intended to be consumed in relatively small amounts at a time, such as, for example, specialty drinks including espresso, matcha tea or other types of roasted or steamed beverages.

Known beverage container assemblies that are smaller in size lack the overall structural design and features that would enhance the drinking experience of a small-sized, specialty beverage by allowing a person to fully capture the taste, aroma and texture of the beverage as it is being consumed. These conventional small-sized container assemblies also do not include a lid and other features that enable a user to take the drink "on-the-go" without being concerned with spillage and exposure to the hot temperature of the beverage contained within.

What is needed is a reusable beverage container assembly, of small size and with features that are made specifically to enhance the quality and the experience of drinking the beverage on the go.

SUMMARY OF THE INVENTION

A beverage container assembly according to an exemplary embodiment of the present invention comprises: a cup for holding a beverage, the cup comprising: an outer wall comprising an outer wall side portion and an outer wall bottom portion, the outer wall side portion defining a first portion of a side surface of the cup and the outer wall bottom portion defining a bottom surface of the cup; and an inner wall comprising an inner wall side portion and an inner wall bottom portion, the inner wall side portion spaced inward from the outer wall side portion towards a longitudinal axis of the cup and having a same profile as that of the outer wall side portion, the inner wall bottom portion spaced upward from the outer wall bottom portion and having a same profile as that of the outer wall bottom portion, and the inner wall defining an interior space of the cup for holding a beverage, wherein the outer wall and the inner wall converge to form a top side wall portion of the cup, and the top side wall portion defines a second portion of the side surface of the cup extending above the first portion of the side surface of the cup and further defines a cup opening that is in communication with the interior space.

In an exemplary embodiment, the cup has a shape of a double truncated cone.

In an exemplary embodiment, the inner wall bottom portion comprises a protrusion.

In an exemplary embodiment, the protrusion has a hemispherical shape.

In an exemplary embodiment, the inner wall side portion comprises an inner side protrusion that extends into the internal space.

In an exemplary embodiment, the inner side protrusion extends entirely around the cup within the internal space.

In an exemplary embodiment, the upper side wall portion terminates at a cup top edge that surrounds and defines the cup opening.

In an exemplary embodiment, at least a portion of the top edge is beveled at an angle that inclines downward from the side surface of the cup to the internal space.

In an exemplary embodiment, the beverage container assembly further comprises a lid.

In an exemplary embodiment, the lid comprises a gasket portion and a top portion disposed above the gasket portion.

In an exemplary embodiment, the top portion comprises a top surface and a side wall extending around the top surface.

In an exemplary embodiment, the side wall comprises a top edge comprising: a top edge first portion that is aligned with the top surface and extends along a first arc of a first imaginary circle that is concentric with an outer circular profile of the lid; and a top edge second portion that extends above the top surface of the lid and which follows a first arc of a second imaginary circle that is shifted relative to the first imaginary circle.

In an exemplary embodiment, the first arc of the first imaginary circle is positioned directly opposite to the first arc of the second imaginary circle.

In an exemplary embodiment, the top edge further comprises top edge third and fourth portions that sweep upward from the top edge first portion to the top edge second portion along respective second and third arcs of the second imaginary circle.

In an exemplary embodiment, the side wall including respective side wall top surfaces expand in width as the top edge third and fourth portions sweep upward toward the top edge second portion.

In an exemplary embodiment, the top edge second portion terminates above the top surface of the lid at a platform.

In an exemplary embodiment, the platform extends parallel to the top surface.

In an exemplary embodiment, the platform comprises a platform opening through which a liquid beverage held in the cup may be consumed.

In an exemplary embodiment, the beverage container assembly further comprises a plurality of openings in the top surface.

In an exemplary embodiment, the plurality of openings is arranged along an arc that is concentric with the first arc of the first imaginary circle.

Other features and advantages of embodiments of the invention will become readily apparent from the following detailed description, the accompanying drawings and the appended claims.

BRIEF DESCRIPTION OF THE DRAWINGS

Exemplary embodiments of the present invention will be described with references to the accompanying figures, wherein.

DETAILED DESCRIPTION

Figure 1:
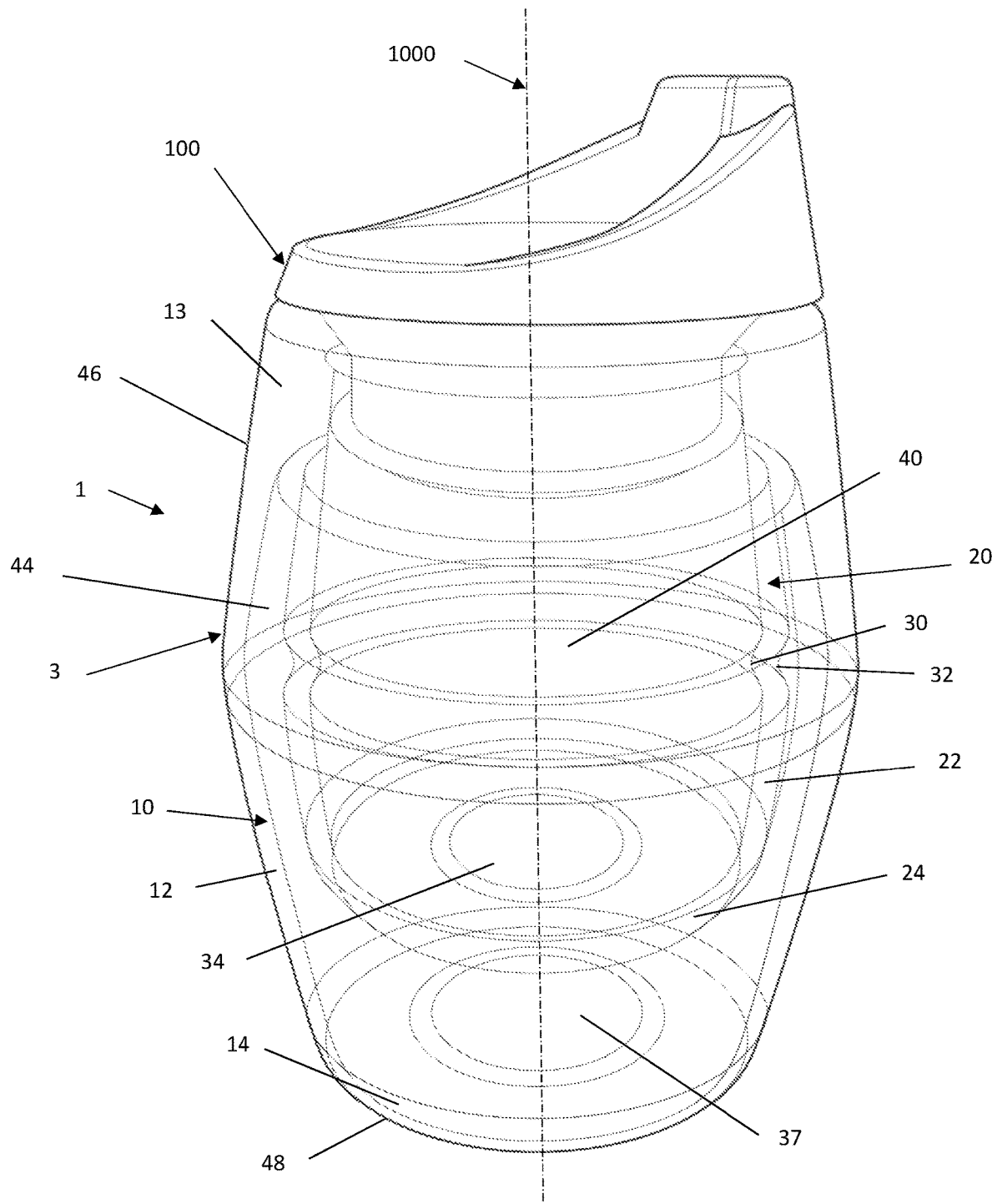
FIG. 1 is a perspective view of a beverage container assembly according to an exemplary embodiment of the present invention.

FIG. 1 is a perspective view of a reusable beverage container assembly, generally designated by reference number 1, according to an exemplary embodiment of the present invention. The container assembly 1 includes a cup, generally designated by reference 3, and a lid, generally designated by reference number 100.

Figure 2:
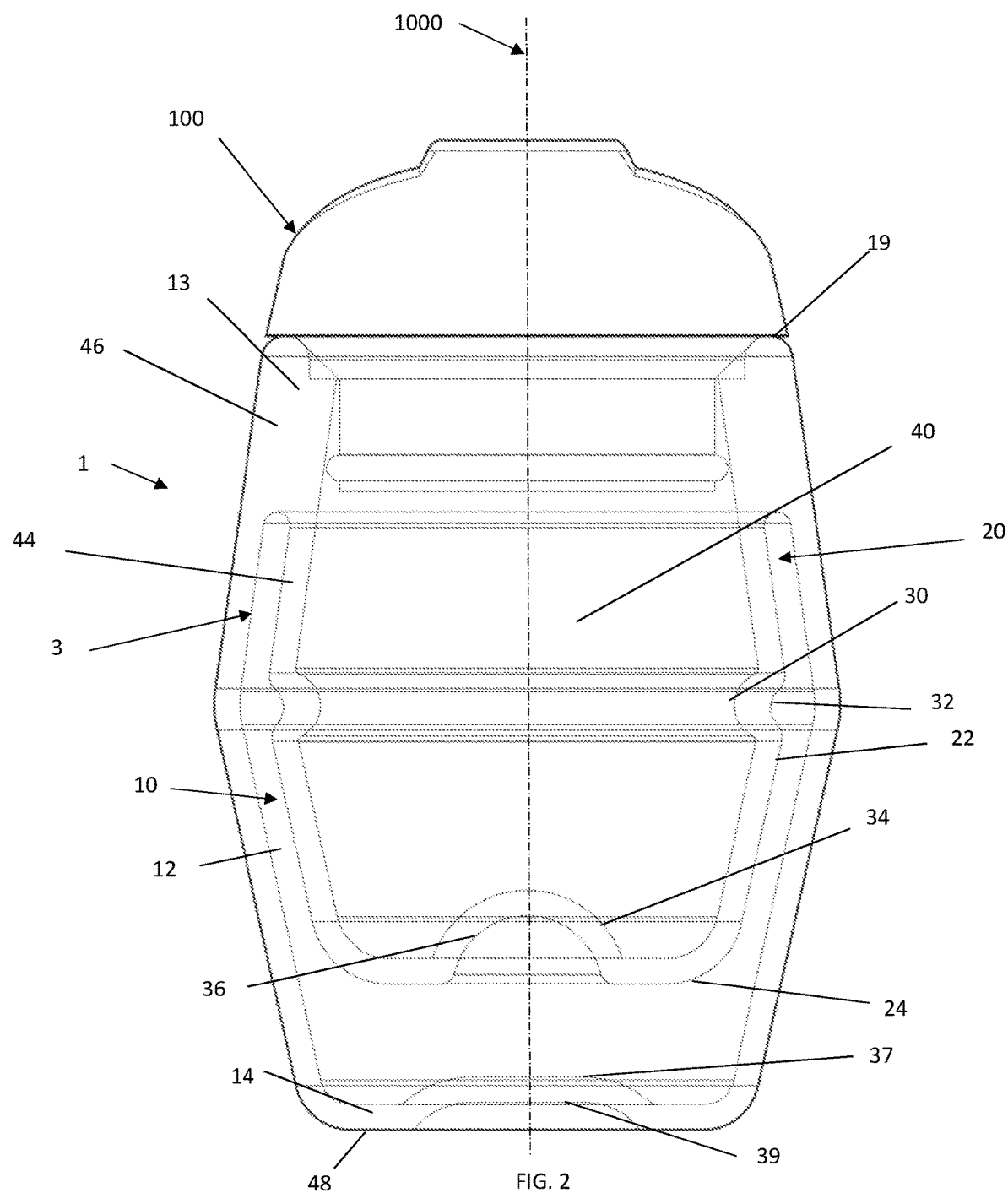
FIG. 2 is a front view of the beverage container assembly of FIG. 1.
Figure 3:
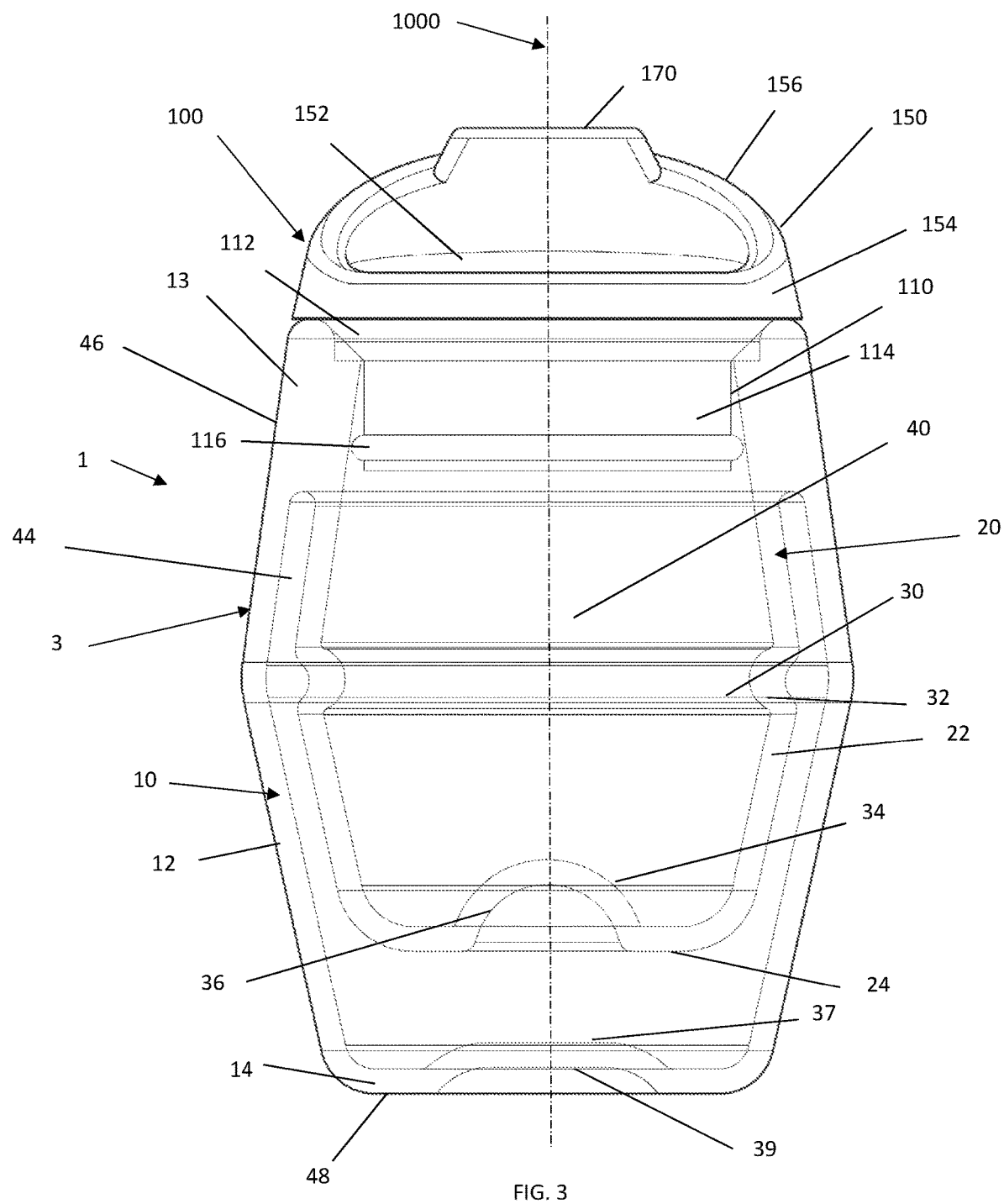
FIG. 3 is a back view of a beverage container assembly of FIG. 1.

The cup 3 generally has a double-walled construction and the overall profile of the cup 3 is that of a truncated double cone, with a top truncated cone portion sharing a base with a bottom truncated cone portion. In an exemplary embodiment, the cup 3 is made of borosilicate glass. However, it should be appreciated that the cup 3 may be made of a other material such as, for example, types of glass composites other than borosilicate glass, ceramic, aluminum and stainless steel. Referring to FIGS. 1-3, the cup 3 includes an outer wall 10 having an outer wall side portion 12 and an outer wall bottom portion 14. The outer wall 10 defines the outer surface of the cup 3 and provides the cup 3 with its double-truncated cone profile. The outer surface of the cup 3 includes side surface 46 (defined by outer wall side portion 12) and bottom surface 48 (defined by outer wall bottom portion 14).

The cup 3 also includes an inner wall 20 that defines a first internal space 40 in communication with a top opening 50 of the cup 3. A beverage may be poured into the top opening 50 and held within the first internal space 40 for later consumption. The outer wall 10 and the inner wall 20 are spaced from one another to thereby define a second internal space 44 of the cup 3.

The profile of inner wall 20 generally follows the profile of the outer wall 10 except at upper and bottom portions of the cup 3. In this regard, the inner wall 20 includes an inner wall side portion 22 having a profile that generally follows that of the outer wall side portion 12 and an inner wall bottom portion 24 having a profile that generally follows that of the outer wall bottom portion 14. In an exemplary embodiment, the outer wall side portion 12 and the inner wall side portion 22 merge into one another as they approach the top of the cup 3, thereby forming a top side wall portion 13 with a single wall construction. Meanwhile, at the bottom portion of the cup 3, the outer wall bottom portion 14 and the inner wall bottom portion 24 diverge from one another, maintaining the double wall construction, but with the outer wall 10 spaced further from the inner wall 20 by a larger amount than the spacing at the sides of the cup 3. The inner wall bottom portion 24 has a diameter that is less than that of the outer wall bottom portion 14.

The inner wall side portion 22 includes an inner side protrusion 30 that extends into the first internal space 40. In an exemplary embodiment, the inner side protrusion 30 forms a rounded rim entirely around the cup 3 within the first internal space 40. The inner side protrusion 30 is preferably located at or near the mid-height of the cup 3. In an exemplary embodiment, the inner wall side portion 22 may include an inner side indentation 32 on the side of the inner wall side portion 22 opposite from the side on which the inner side protrusion 30 is located and in line with the inner side protrusion 30.

The inner wall 20 further includes an inner bottom protrusion 34 that extends into the first internal space 40. In an exemplary embodiment, the inner bottom protrusion 34 forms a generally hemispherical profile that extends upward into the first internal space 40. The inner bottom protrusion 34 is intended to aid in mixing of the beverage held in the internal space 40. The inner bottom protrusion 34 is preferably located in line with longitudinal axis 1000 of the cup 3. In an exemplary embodiment, the inner wall bottom portion 24 may include an inner bottom indentation 36 on the side of the bottom wall side portion 24 opposite from the side on which the inner bottom protrusion 34 is located and in line with the inner bottom protrusion 34.

In an exemplary embodiment, the outer wall bottom portion 14 includes an outer bottom protrusion 37 that extends into the second internal space 44. In an exemplary embodiment, the outer bottom protrusion 37 has a generally flattened hemispherical profile that extends upward into the second internal space 44. The outer bottom protrusion 37 is preferably located in line with longitudinal axis 1000 of the cup 3. In an exemplary embodiment, the outer wall bottom portion 14 may include an outer bottom indentation 39 on the side of the outer wall bottom portion 14 opposite from the side on which the outer bottom protrusion 37 is located and in line with the outer bottom protrusion 37.

As shown in the figures, the upper side wall portion 13 terminates at top edge 19 that surrounds and defines the top opening 50. In an exemplary embodiment, at least a portion of the top edge 19 is beveled at an angle that inclines downward from the side surface 46 of the cup 3 to the first internal space 40. As explained in further detail below, the beveled top edge 19 allows for attachment of the lid 100 to the cup 3.

As shown in FIG. 3, the lid 100 includes a gasket portion 110 and a top portion 150 disposed above the gasket portion 110. The lid 100 is preferably a unitary structure, although it should be appreciated that the lid 100 may include separate components. The gasket portion 110 is configured to form an air-tight seal with the beveled top edge 19 of the upper side wall portion 13 of the cup 3. In this regard, at least the gasket portion 110 of the lid 100 is made of a flexible material, such as, for example, siliconized rubber.

The gasket portion 110 of the lid 100 includes a gasket top portion 112 with a side wall that angles inward at an angle that preferably matches that of the beveled top edge 19. The gasket portion 110 further includes a gasket bottom portion 114 with a side wall that extends generally parallel to the longitudinal axis 1000 of the cup 3. In an exemplary embodiment, the gasket bottom portion 114 includes a protrusion 116 that extends completely around the gasket bottom portion 114. The protrusion 116 forms a rounded rim around the gasket bottom portion 114 having an outer diameter that is larger than the diameter of the opening 50. The protrusion 116 flexes as the lid 100 is pushed into the opening 50 to thereby assist in forming the air-tight seal with the beveled top edge 19.

Figure 4:
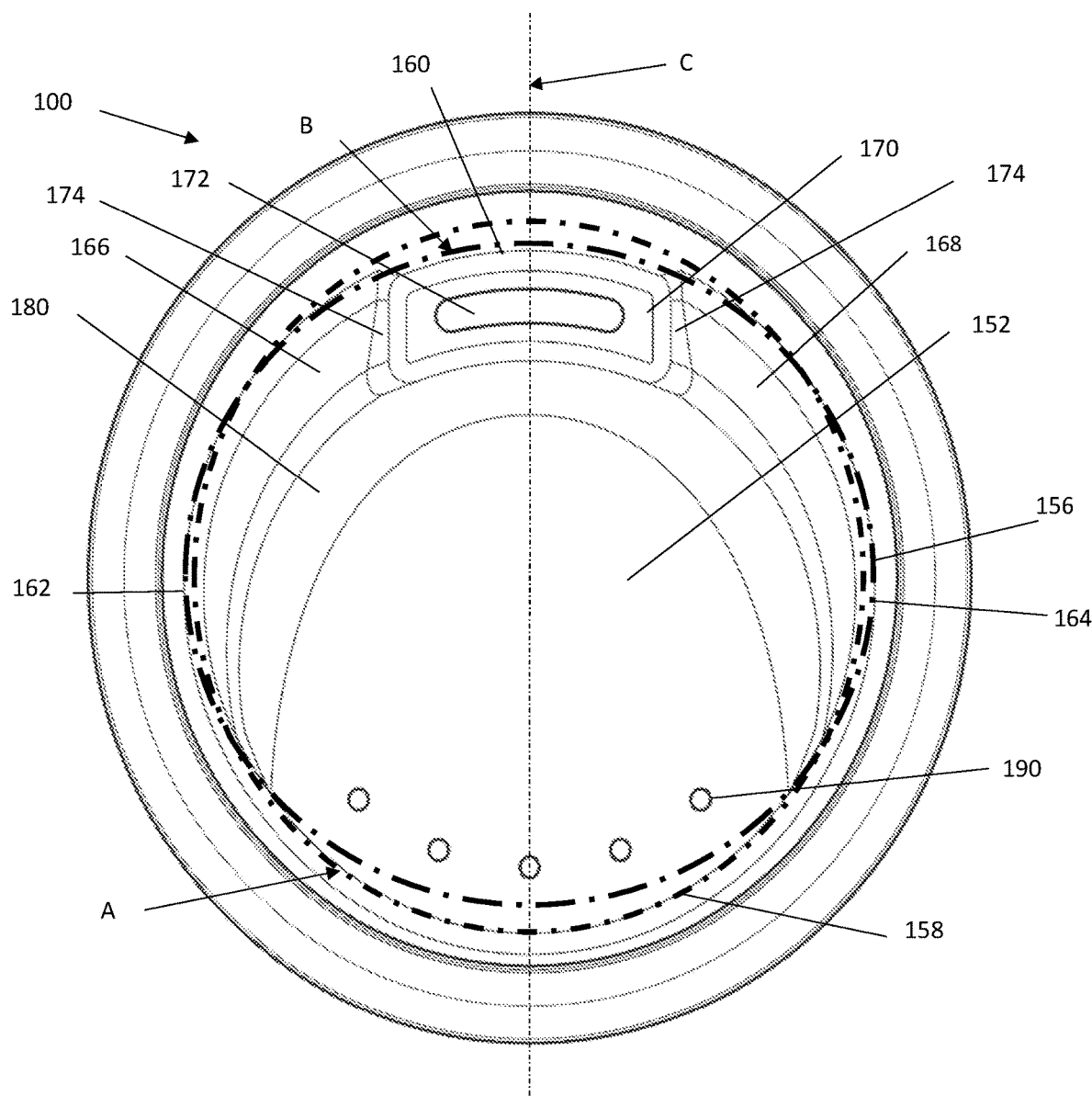
FIG. 4 is a top view of a lid according to an exemplary embodiment of the present invention.

The top portion 150 of the lid 100 includes a top surface 152 and a side wall 154 that extends around the top surface 152. The side wall 154 has a top edge 156. As shown in FIG. 4, the top edge 156 includes a top edge first portion 158 that is aligned with the top surface 152 along a first arc of an imaginary circle A that is concentric with the outer circular profile of the lid 100. The top edge 156 further includes a top edge second portion 160 that extends above the top surface 152 of the lid 1 along an arc that follows a first arc of an imaginary circle B that is shifted relative to the imaginary circle A. In an exemplary embodiment, the first arc of the imaginary circle A is positioned directly opposite to the first arc of the imaginary circle B. That is, an imaginary line C extending through the diameter of the imaginary circle A divides each of the first arc of the imaginary circle A and the first arc of the imaginary circle B into two smaller arcs that are equal in length to one another.

The top edge 156 further includes top edge third and fourth portions 162, 164 that sweep upward from the top edge first portion 158 to the top edge second portion 160 along respective second and third arcs of the imaginary circle B. In an exemplary embodiment, the second and third arcs are direct extensions of the first arc of the imaginary circle B. That is, the second arc extends directly from one side of the first arc and the third arc extends directly from the opposite side of the first arc. In an exemplary embodiment, the top edge third and fourth portions 162, 164 are equal in length (that is, the second and third arcs of the imaginary circle B have equal lengths). As the top edge third and fourth portions 162, 164 sweep upward, the side wall 154 including respective side wall top surfaces 166, 168 expand in width.

The top edge second portion 160 terminates above the top surface 152 of the lid 100 at a platform 170 that extends generally parallel to the top surface 152. That platform 170 forms the top surface of a spout through which the beverage may be consumed. In this regard, the platform 170 includes a platform opening 172 that is in communication with the cup top opening 50.

In an exemplary embodiment, the platform 170 and platform opening 172 have profiles that follow the first arc of the imaginary circle B. In this regard, the platform 170 and platform opening 172 may have a curved rectangular profile where the curve of the rectangle follows the first arc of the imaginary circle B, although it should be appreciated that the platform 170 and/or the opening 172 may have other shapes, such as, for example, circular, square or oval. In an exemplary embodiment, the platform 170 includes platform side walls 174 that extend downward from the platform 170 to connect with the side wall top surfaces 166, 168. In an exemplary embodiment, the platform side walls 174 extend outward at a constant angle from the platform 170 to the side wall top surfaces 166, 168, although it should be appreciated that the platform side walls 174 may instead extend generally parallel to the longitudinal axis 1000 of the cup 3.

The side wall 154 includes a side wall inner surface 180 that extends above the lid surface 152. In an exemplary embodiment, the side wall inner surface 180 sweeps inward toward the center of the lid surface 152 as it approaches the lid surface 152. That is, there is a gradual transition between the side wall inner surface 180 and the lid surface 152. It should be appreciated that the side wall inner surface 180 is not limited to this profile, and instead may, for example, extend generally parallel to the longitudinal axis 1000 along its height.

Figure 5:
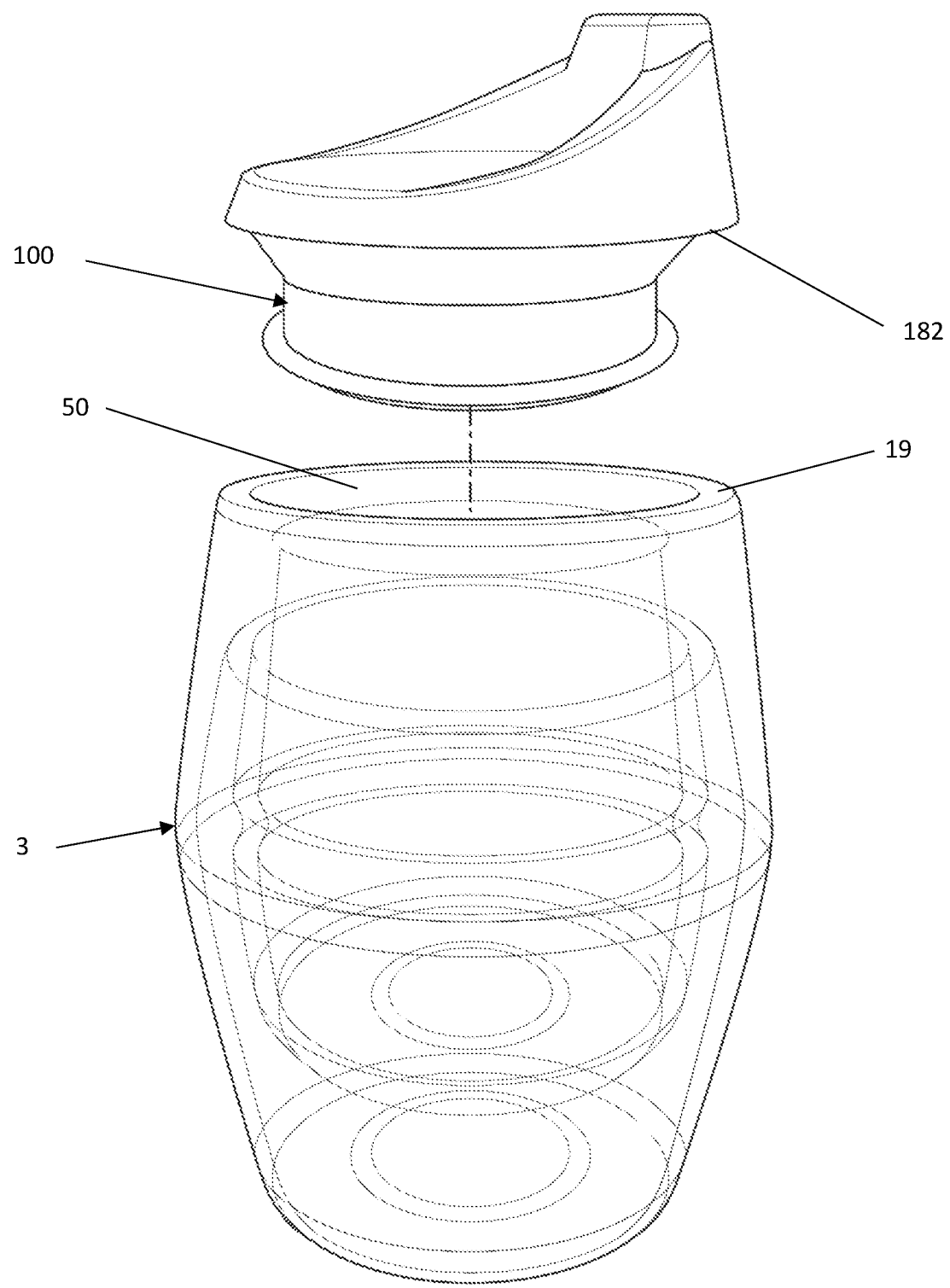
FIG. 5 is an exploded view of a beverage container assembly according to an exemplary embodiment of the present invention.

The side wall 154 of the lid 100 further includes a bottom edge 182. In an exemplary embodiment, the bottom edge 182 of the lid 100 defines the outer circumference of the lid 100, and preferably has the same diameter as that of the top edge 19 of the cup 3. In the exploded view shown in FIG. 5, this allows the bottom edge 182 to sit on top of the top edge 19 when the lid 100 is placed on the cup 3.

In an exemplary embodiment, the top surface 152 of the lid 100 include one or more openings 190. In a preferred embodiment, a series of openings 190 are disposed in the lid 100 and arranged in an arc-like pattern. In an exemplary embodiment, the arc-like pattern follows (e.g., is concentric with) the curvature of the first arc of the imaginary circle A.

Figure 6:
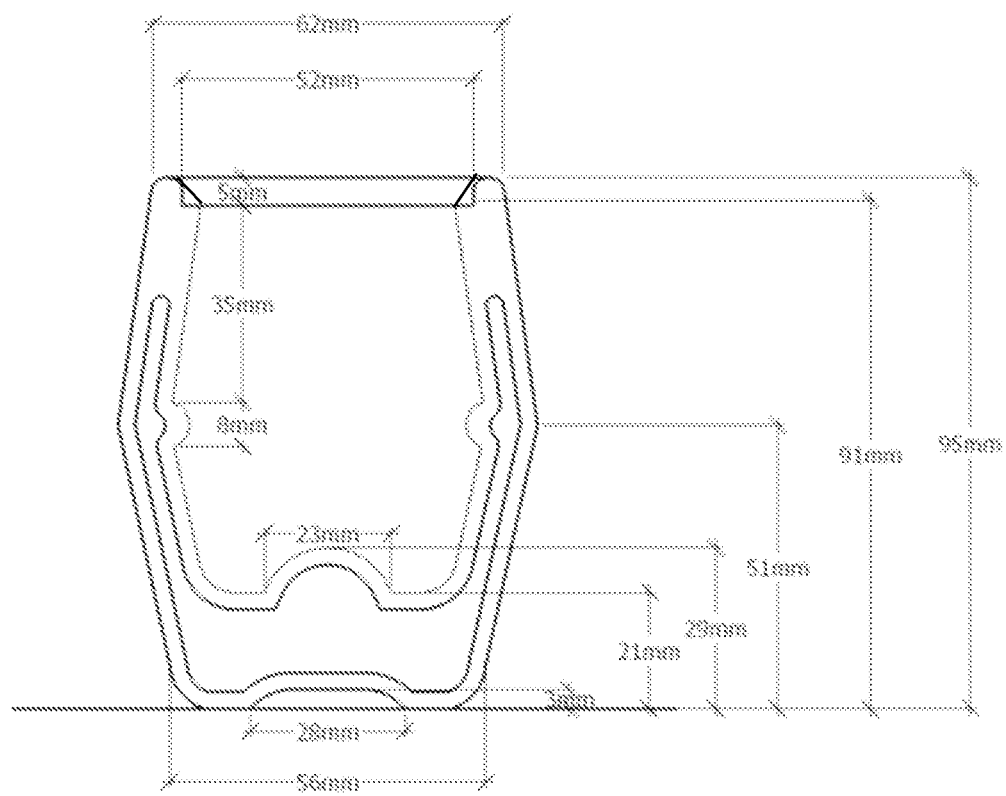
FIG. 6 is a diagram indicating measured dimensions of a beverage container assembly according to an exemplary embodiment of the present invention.

FIG. 6 indicates several measured dimensions of a beverage container assembly according to an exemplary embodiment of the present invention. It should be appreciated that the measurements are not limited to those shown in FIG. 6. In general, the profile of the inventive beverage container assembly is intended to maximize the experience of the user in consuming a specialty beverage, such as, for example, espresso, in terms of taste, aroma and texture. For example, the generous width of the cup enhances the funneling of aroma through the openings in the lid, and the openings themselves are positioned in such a way on the lid so that the user's nose is directly over the openings during use of the assembly.

It should also be appreciated that the overall profile and specific shapes of the various components of the cup and lid in accordance with exemplary embodiments of the present invention are not limited to those described herein. For example, in other exemplary embodiments, the rounded protrusions may be absent from one or both of the inner and outer walls of the cup, and/or the shapes of the protrusions may be varied.

Now that embodiments of the present invention have been shown and described in detail, various modifications and improvements thereon will become readily apparent to those skilled in the art. Accordingly, the spirit and scope of the present invention is to be construed broadly and not limited by the foregoing specification.

What is claimed is:

1. A beverage container assembly comprising:
   a cup for holding a beverage, the cup comprising:
      an outer wall comprising an outer wall side portion and an outer wall bottom portion, the outer wall side portion defining a first portion of a side surface of the cup and the outer wall bottom portion defining a bottom surface of the cup, the outer wall having a shape of a double truncated cone, the double truncated cone shape of the outer wall comprising a top truncated cone shape and bottom truncated cone shape disposed below the top truncated cone shape, the top truncated cone shape having an imaginary base with a first diameter and an imaginary top with a second diameter that is less than the first diameter of the imaginary base of the top truncated cone shape, and the bottom truncated cone having an imaginary base with a first diameter and an imaginary top with a second diameter that is larger than the first diameter of the imaginary base of the bottom truncated cone shape; and
      an inner wall comprising an inner wall side portion and an inner wall bottom portion, the inner wall side portion spaced inward from the outer wall side portion towards a longitudinal axis of the cup and having a same profile as that of the outer wall side portion, the inner wall bottom portion spaced upward from the outer wall bottom portion and having a same profile as that of the outer wall bottom portion, and the inner wall defining an interior space of the cup for holding a beverage, the inner wall having a shape of a double truncated cone, the double truncated cone shape of the inner wall comprising a top truncated cone shape and bottom truncated cone shape disposed below the top truncated cone shape, the top truncated cone shape having an imaginary base with a first diameter and an imaginary top with a second diameter that is less than the first diameter of the imaginary base of the top truncated cone shape, and the bottom truncated cone having an imaginary base with a first diameter and an imaginary top with a second diameter that is larger than the first diameter of the imaginary base of the bottom truncated cone shape, wherein the outer wall and the inner wall converge to form a top side wall portion of the cup, and the top side wall portion defines a second portion of the side surface of the cup extending above the first portion of the side surface of the cup and further defines a cup opening that is in communication with the interior space.

2. The beverage container assembly of claim 1, wherein the inner wall bottom portion comprises a protrusion.

3. The beverage container assembly of claim 2, wherein the protrusion has a hemispherical shape.

4. The beverage container assembly of claim 1, wherein the inner wall side portion comprises an inner side protrusion that extends into the internal space.

5. The beverage container assembly of claim 4, wherein the inner side protrusion extends entirely around the cup within the internal space.

6. The beverage container assembly of claim 1, wherein the top side wall portion terminates at a cup top edge that surrounds and defines the cup opening.

7. The beverage container assembly of claim 6, wherein at least a portion of the top edge is beveled at an angle that inclines downward from the side surface of the cup to the internal space.

8. The beverage container assembly of claim 1, further comprising a lid.

9. The beverage container assembly of claim 8, wherein the lid comprises a gasket portion and a top portion disposed above the gasket portion.

10. The beverage container assembly of claim 9, wherein the top portion comprises a top surface and a side wall extending around the top surface.

11. The beverage container assembly of claim 10, wherein the side wall comprises a top edge comprising:
    a top edge first portion that is aligned with the top surface and extends along a first arc of a first imaginary circle that is concentric with an outer circular profile of the lid; and
    a top edge second portion that extends above the top surface of the lid and which follows a first arc of a second imaginary circle that is shifted relative to the first imaginary circle.

12. The beverage container assembly of claim 11, wherein the first arc of the first imaginary circle is positioned directly opposite to the first arc of the second imaginary circle.

13. The beverage container assembly of claim 12, wherein the top edge further comprises top edge third and fourth portions that sweep upward from the top edge first portion to the top edge second portion along respective second and third arcs of the second imaginary circle.

14. The beverage container assembly of claim 13, the side wall including respective side wall top surfaces expand in width as the top edge third and fourth portions sweep upward toward the top edge second portion.

15. The beverage container assembly of claim 13, wherein the top edge second portion terminates above the top surface of the lid at a platform.

16. The beverage container assembly of claim 15, wherein the platform extends parallel to the top surface.

17. The beverage container assembly of claim 15, wherein the platform comprises a platform opening through which a liquid beverage held in the cup may be consumed.

18. The beverage container assembly of claim 11, further comprising a plurality of openings in the top surface.

19. The beverage container assembly of claim 18, wherein the plurality of openings is arranged along an arc that is concentric with the first arc of the first imaginary circle.

* * * * *